(12) United States Patent
Li et al.

(10) Patent No.: US 11,385,529 B2
(45) Date of Patent: Jul. 12, 2022

(54) CAMERA BRACKET

(71) Applicant: Hangzhou Hikvision Digital Technology Co., Ltd., Zhejiang (CN)

(72) Inventors: Yang Li, Zhejiang (CN); Caisheng Yan, Zhejiang (CN); Zhan Ye, Zhejiang (CN)

(73) Assignee: Hangzhou Hikvision Digital Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/606,882

(22) PCT Filed: May 6, 2020

(86) PCT No.: PCT/CN2020/088751
§ 371 (c)(1),
(2) Date: Oct. 27, 2021

(87) PCT Pub. No.: WO2020/228569
PCT Pub. Date: Nov. 19, 2020

(65) Prior Publication Data
US 2022/0146916 A1    May 12, 2022

(30) Foreign Application Priority Data
May 10, 2019 (CN) .......................... 201910388807.X

(51) Int. Cl.
*G03B 17/56* (2021.01)
*F16M 11/06* (2006.01)

(52) U.S. Cl.
CPC ........... *G03B 17/561* (2013.01); *F16M 11/06* (2013.01)

(58) Field of Classification Search
CPC ...... G03B 17/56; G03B 17/561; F16M 11/02; F16M 11/04; F16M 11/06; F16M 11/10;
(Continued)

(56) References Cited

U.S. PATENT DOCUMENTS 3,952,982 A   4/1976 Lewis
4,310,136 A   1/1982 Mooney
(Continued)

FOREIGN PATENT DOCUMENTS

CN    102384344 B   * 11/2013
CN    203385990 U    1/2014
(Continued)

*Primary Examiner* — Clayton E. LaBalle
*Assistant Examiner* — Fang-Chi Chang
(74) *Attorney, Agent, or Firm* — Bret E. Field; Bozicevic, Field & Francis LLP

(57) ABSTRACT

A camera bracket includes a T-direction supporting base (1) and a rotatory adjustment mechanism (2); a fixed tooth slot (10) is provided in the T-direction supporting base; the rotatory adjustment mechanism includes a rotatory supporting base (20), an adapter (21) and a fine adjustment bolt assembly (22). The rotatory supporting base includes a fine adjustment plate (200) and a rotatory tooth slot (201) fixedly connected, and a limiting hole (200*a*) is provided in the fine adjustment plate; the adapter includes a rotatory connection portion (210) and a connection base (211) fixedly connected. The connection base is provided with a fine adjustment threaded hole (211*a*) corresponding to the limiting hole which can be aligned with the limiting hole in a vertical plane perpendicular to an axis of the rotatory tooth slot. The fine adjustment bolt assembly includes a fine adjustment bolt (220), and the fine adjustment bolt is provided with a threaded portion (220*a*) and a limiting portion (220*b*), and the fine adjustment bolt passes through the limiting hole, and the threaded portion is threadedly connected to the fine adjustment threaded hole, and the limiting portion is lifted by an edge of the limiting hole and cannot pass through the limiting hole. The camera bracket can finely adjust the T-direction angle, so as to meet the required angle accuracy requirements.

14 Claims, 5 Drawing Sheets

(58) Field of Classification Search
CPC .... F16M 11/105; F16M 11/12; F16M 11/125; F16M 11/126; F16M 11/128; F16M 11/2007; F16M 11/2021; F16M 11/2028; F16M 11/2057; F16M 11/2064; F16M 11/2071
See application file for complete search history.

(56) References Cited

U.S. PATENT DOCUMENTS

| | | | |
|---|---|---|---|
| 2012/0168391 A1* | 7/2012 | Liu | F16M 13/02 211/26 |
| 2018/0164662 A1 | 6/2018 | Olmos-Calderon | |

FOREIGN PATENT DOCUMENTS

| | | | |
|---|---|---|---|
| CN | 204629041 U | | 9/2015 |
| CN | 205592601 U | | 9/2016 |
| CN | 107255853 A | | 10/2017 |
| CN | 206685089 U | | 11/2017 |
| CN | 206958535 U | | 2/2018 |
| CN | 207527266 U | | 6/2018 |
| CN | 207702045 U | | 8/2018 |
| CN | 208123796 U | | 11/2018 |
| CN | 109027638 A | | 12/2018 |
| CN | 208735142 U | | 4/2019 |
| CN | 208779031 U | | 4/2019 |
| CN | 209399072 U | * | 9/2019 |
| CN | 209861009 U | | 12/2019 |
| JP | H05191689 A | | 7/1993 |
| JP | 2014230118 A | | 12/2014 |

* cited by examiner

CAMERA BRACKET

The present application claims the priority to a Chinese patent application No. 201910388807.X filed with the China National Intellectual Property Administration on May 10, 2019 and entitled "Camera Bracket", which is incorporated herein by reference in its entirety.

TECHNICAL FIELD

The present application relates to the technical field of image acquisition, and in particular to a camera bracket.

BACKGROUND

With the development of science and technology, image acquisition technology is more and more widely applied in environmental monitoring, artificial intelligence and other fields.

In related technologies, a camera is usually used for image collection. In order to fix the camera and keep it at the required angle for shooting, the camera bracket is usually used to position the camera in a T-direction (vertical direction) and a P-direction (horizontal direction). Since the camera will be affected by gravity in the T-direction, in order to overcome the gravity, the angle of the camera bracket in T-direction is usually adjusted by the mutual engagement of a fixed tooth slot and a rotatory tooth slot. The fixed tooth slot is fixedly arranged on the T-direction supporting base, and the rotatory tooth slot is fixedly arranged on the rotatory supporting base for connecting the camera. A ring of teeth is evenly distributed along the circumferential direction on the fixed tooth slot and the rotating tooth slot respectively. The two rings of teeth can engage with each other in the circumferential direction, so that the purpose of adjusting the angle of the rotatory supporting base and the angle of the camera in the T-direction is achieved by rotating the rotatory tooth slot.

However, the above angle adjustment method needs to make adjustment by the angle of at least one tooth at a time. Taking 50 teeth in a circle as an example, the angle difference between two adjacent teeth can reach 7.2°, that is, the minimum adjustment angle in the T-direction is 7.2°. For some telephoto cameras, this adjustment range is too large to meet the required accuracy requirements.

SUMMARY

The purpose of the embodiments of the present application is to provide a camera bracket to increase the accuracy of T-direction adjustment. Specifically, the technical solutions are as follows.

An embodiment of the present application provides a camera bracket, including a T-direction supporting base and a rotatory adjustment mechanism.

A fixed tooth slot is provided in the T-direction supporting base.

The rotatory adjustment mechanism includes a rotatory supporting base, an adapter and a fine adjustment bolt assembly, and the rotatory supporting base includes a fine adjustment plate and a rotatory tooth slot coaxially engaged with the fixed tooth slot, and the fine adjustment plate is fixedly connected to the rotatory tooth slot, and a limiting hole is provided in the fine adjustment plate.

The adapter includes a rotatory connection portion and a connection base for connecting the camera, and the rotatory connection portion is fixedly connected to the connection base and can be coaxially and rotatably connection with the rotatory tooth slot, and the connection base is provided with a fine adjustment threaded hole corresponding to the limiting hole.

When the rotatory connection portion is coaxially and rotatably connected to the rotatory tooth slot, the fine adjustment threaded hole can be aligned with the limiting hole in a vertical plane perpendicular to an axis of the rotatory tooth slot.

The fine adjustment bolt assembly includes a fine adjustment bolt provided with a threaded portion and a limiting portion, and the fine adjustment bolt passes through the limiting hole, and the threaded portion is threadedly connected to the fine adjustment threaded hole, and the limiting portion is lifted by an edge of the limiting hole and cannot pass through the limiting hole.

Optionally, in the above-mentioned camera bracket, the connection base is located above the fine adjustment plate when the rotatory connection portion is coaxially and rotatably connected to the rotatory tooth slot.

Optionally, in the above-mentioned camera bracket, the fine adjustment bolt further includes an adjustment portion, and the threaded portion, the limiting portion and the adjustment portion are sequentially arranged, and the adjustment portion passes through the limiting hole.

Optionally, in the above-mentioned camera bracket, the fine adjustment bolt assembly further includes a rotatory adjustment member, and the rotatory adjustment member is connected to the adjustment portion.

Optionally, in the above-mentioned camera bracket, the fine adjustment bolt assembly further includes a connection shaft, and the rotatory adjustment member has a cam, and the connection shaft sequentially passes through the cam and the adjustment portion and rotatably connects the cam to the adjustment portion, and the cam and the adjustment portion have a locking position that can be reached by rotation.

Optionally, in the above-mentioned camera bracket, the fine adjustment bolt assembly further includes a gasket, which is sleeved on the adjustment portion and is located on a side of the limiting hole away from the limiting portion, and the cam presses the gasket towards an inside of the limiting hole when the cam is in the locking position.

Optionally, in the above-mentioned camera bracket, a gasket-limiting slot is further provided around the limiting hole in the fine adjustment plate, and the gasket is embedded in the gasket-limiting slot.

Optionally, in the above-mentioned camera bracket, the rotatory adjustment member is further provided with a trigger, the cam and the adjustment portion are not in the locking position when the trigger is located on a side of the cam away from the limiting hole.

Optionally, in the above-mentioned camera bracket, the limiting portion is provided with an arc-shaped guiding surface lifted by the edge of the limiting hole, and the limiting hole and the arc-shaped guiding surface can cooperate to change an angle between an axis of the fine adjustment bolt and an axis of the limiting hole.

Optionally, in the above-mentioned camera bracket, the rotatory supporting base is further provided with a connection post coaxially connected to the rotatory tooth slot, and the rotatory connection portion is provided with a connection through hole through which the connection post coaxially passes.

The rotatory adjustment mechanism further includes a coaxial connection assembly that prevents the connection post from being disengaged from the connection hole along the axis of the rotatory tooth slot.

Optionally, in the above-mentioned camera bracket, the coaxial connection assembly includes an abutment member and a limit screw, and a limit screw hole is provided in the connection post, and the abutment member abuts against a side of the connection through hole away from the rotary tooth slot, and a limiting through hole is provided in the abutment member, and the limit screw passes through the limiting through hole and is threadedly connected to the limit screw hole.

Optionally, in the above-mentioned camera bracket, the coaxial connection assembly further includes a wave gasket arranged between the rotary connection portion and the abutment member.

Optionally, in the above-mentioned camera bracket, further including a P-direction supporting base having an adjustment shaft perpendicular to the horizontal plane, the T-direction supporting base is connected to the P-direction supporting base and can adjust the angle of the T-direction supporting base along the adjustment shaft.

Optionally, in the above-mentioned camera bracket, the P-direction supporting base is provided with a supporting base flange, and a plurality of adjustment holes are arranged in the supporting base flange along a circumferential direction of the adjustment shaft, and the T-direction supporting base is provided with a P-direction flange fixedly connected to the fixed tooth slot, and the P-direction flange has an arc-shaped adjustment hole extending along the circumferential direction of the adjustment shaft, and the arc-shaped adjustment hole is aligned with a plurality of the adjustment holes when the supporting base flange is aligned with the P-direction flange at any angle.

The camera bracket further includes a fastening bolt assembly that passes through the arc-shaped adjustment hole and the adjustment hole and fixes the supporting base flange and the P-direction flange.

The camera bracket disclosed in the embodiment of the present application can finely adjust the angle of the camera in the T-direction by providing a rotary adjustment mechanism with a fine adjustment bolt assembly, so as to meet the required angle accuracy requirements.

BRIEF DESCRIPTION OF THE DRAWINGS

In order to more clearly describe the technical solution of the embodiments of the present application and the prior art, drawings used in the embodiments and the prior art will be briefly described below. Obviously, the drawings described below are for only some embodiments of the present application, one of ordinary skills in the art can also obtain other drawings based on these drawings illustrated herein without any creative efforts.

DESCRIPTION OF REFERENCE SIGNS

1: T-direction supporting base, 10: fixed tooth slot, 12: P-direction flange, 120: arc-shaped adjustment hole, 2: rotatory adjustment mechanism, 20: rotatory supporting base, 200: fine adjustment plate, 200a: limiting hole, 200b: gasket-limiting slot, 201: rotatory tooth slot, 202: connection post, 202a: limit screw hole, 21: adapter, 210: rotatory connection portion, 210a: connection through hole, 211: connection base, 211a: fine adjustment threaded hole, 22: fine adjustment bolt assembly, 220: fine adjustment bolt, 220a: threaded portion, 220b: limiting portion, 220b1: arc-shaped guiding surface, 220c: adjustment portion, 221: rotatory adjustment member, 221a: cam, 221b: trigger, 222: connection shaft, 223: gasket, 23: coaxial connection assembly, 230: abutment member, 230a: limiting through hole, 231: limit screw, 232: wave gasket, 3: P-direction supporting base, 30: supporting base flange, 300: adjustment hole, 4: fastening bolt assembly, 5: camera, 6: connection bolt.

DETAILED DESCRIPTION

In order to make objectives, technical solutions and advantages of the present application more apparent, the present application now will be described in detail with reference to the accompanying drawings and by way of examples. Obviously, the embodiments described are only some of the embodiments of the present application instead of all of them. All other embodiments obtained by those of ordinary skills in the art based on the embodiments herein without any creative efforts fall within the scope of the present application.

The technical solutions provided by the embodiments of the present application are described below with reference to the accompanying drawings.

An embodiment of the present application discloses a camera bracket, as shown in FIGS. 1 to 8. The camera bracket includes a T-direction supporting base 1 and a rotatory adjustment mechanism 2. The T-direction supporting base 1 and the rotatory adjustment mechanism 2 in the embodiment of the present application can cooperate to realize the angle adjustment in the T-direction.

Figure 3:
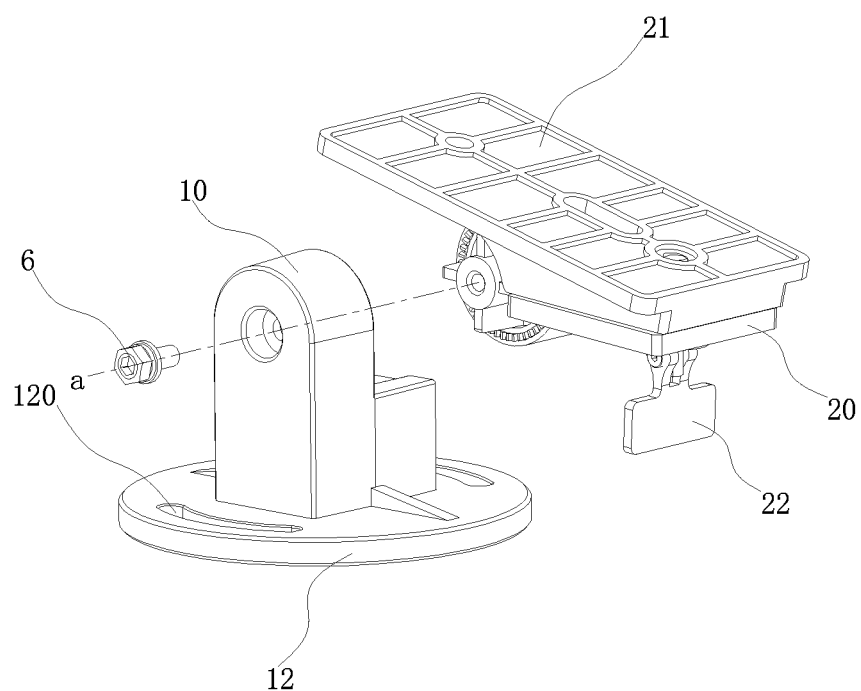
FIG. 3 is a separate structural view of a T-direction supporting base and a rotary adjustment mechanism disclosed by an embodiment of the present application.
Figure 4:
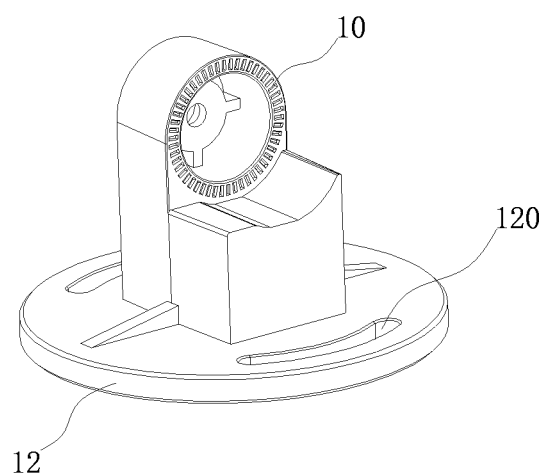
FIG. 4 is a detailed structural view of a T-direction supporting base disclosed by an embodiment of the present application.

Specifically, as shown in FIGS. 3 and 4, a fixed tooth slot 10 is provided in the T-direction supporting base 1, and an axis a of the fixed tooth slot 10 is parallel to a horizontal plane. Meanwhile, the rotatory adjustment mechanism 2 includes a rotatory supporting base 20, an adapter 21 and a fine adjustment bolt assembly 22. The rotatory supporting base 20 in turn includes a fine adjustment plate 200 and a rotatory tooth slot 201 coaxially engaged with the fixed tooth slot 10. The fine adjustment plate 200 and the rotatory tooth slot 201 are structurally engaged in a fixed connection manner. The adapter 21 includes a rotatory connection portion 210 and a connection base 211 for connecting the camera 5. The rotatory connection portion 210 is fixedly connected to the connection base 211, and the rotatory connection portion 210 can be coaxially and rotatably connected to the rotatory tooth slot 201.

Regarding the structures and engagement mode of the fixed tooth slot 10 and the rotatory tooth slot 201 in the embodiment of the present application, reference can be made to the structures and engagement mode of the fixed tooth slot and the rotatory tooth slot in the related art. The T-direction angle can be adjusted through the engagement of the fixed tooth slot and the rotatory tooth slot, and the minimum angle by which adjustment can be made is an angle difference between two adjacent teeth on the tooth slot. Therefore, the T-direction angle of the rotatory supporting base 20 can be roughly adjusted through the engagement of the fixed tooth slot 10 and the rotatory tooth slot 201. At this time, if the adapter 21 remains relatively fixed to the rotatory supporting base 20, the adapter 21 and the camera 5 connected thereto can also rotate with the rotatory supporting base 20, thereby changing the T-direction angle. The adapter 21 and the camera 5 can be fixed by one or more of adhesion, snap-on, and bolt connection.

Further, the fine adjustment plate 200 in the embodiment of the present application is provided with a limiting hole 200a, and the connection base 211 is provided with a fine adjustment threaded hole 211a corresponding to the limiting hole 200a. When the rotatory connection portion 210 rotates coaxially with the rotatory tooth slot 201, the fine adjustment threaded hole 211a can be aligned with the limiting hole 200a in a vertical plane perpendicular to an axis of the rotatory tooth slot 201.

Figure 5:
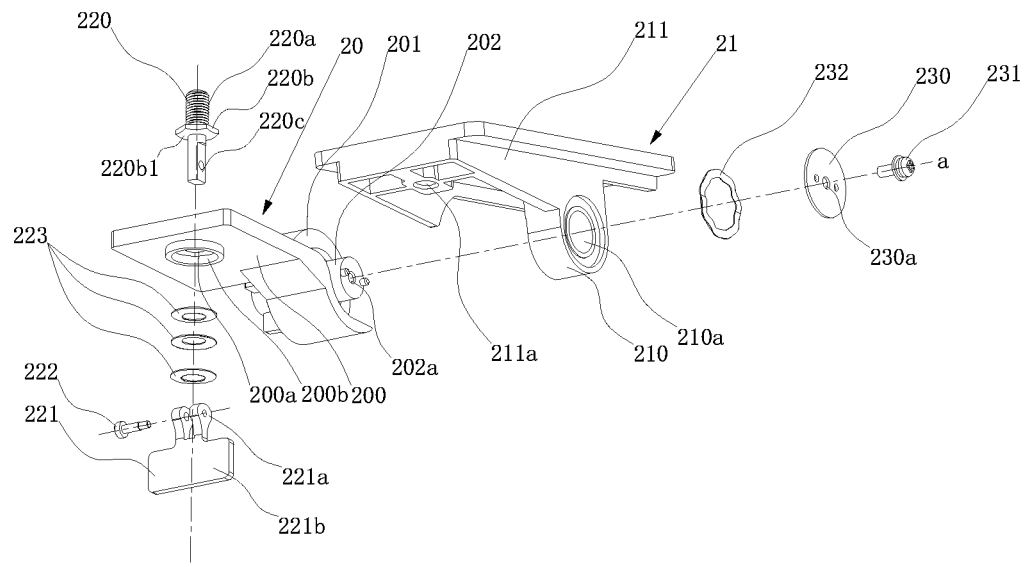
FIG. 5 is an exploded structural view of a rotary adjustment mechanism disclosed by an embodiment of the present application.
Figure 6:
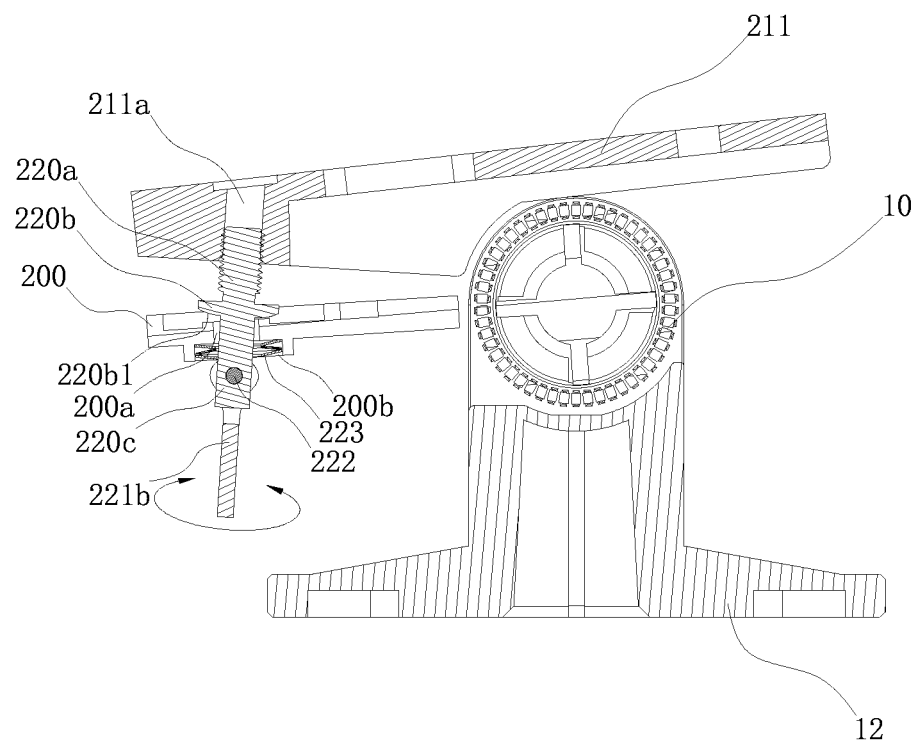
FIG. 6 is a cross-sectional structural view of a T-direction supporting base and a rotary adjustment mechanism with a cam is in an unlocked position disclosed by the embodiment of the present application.
Figure 7:
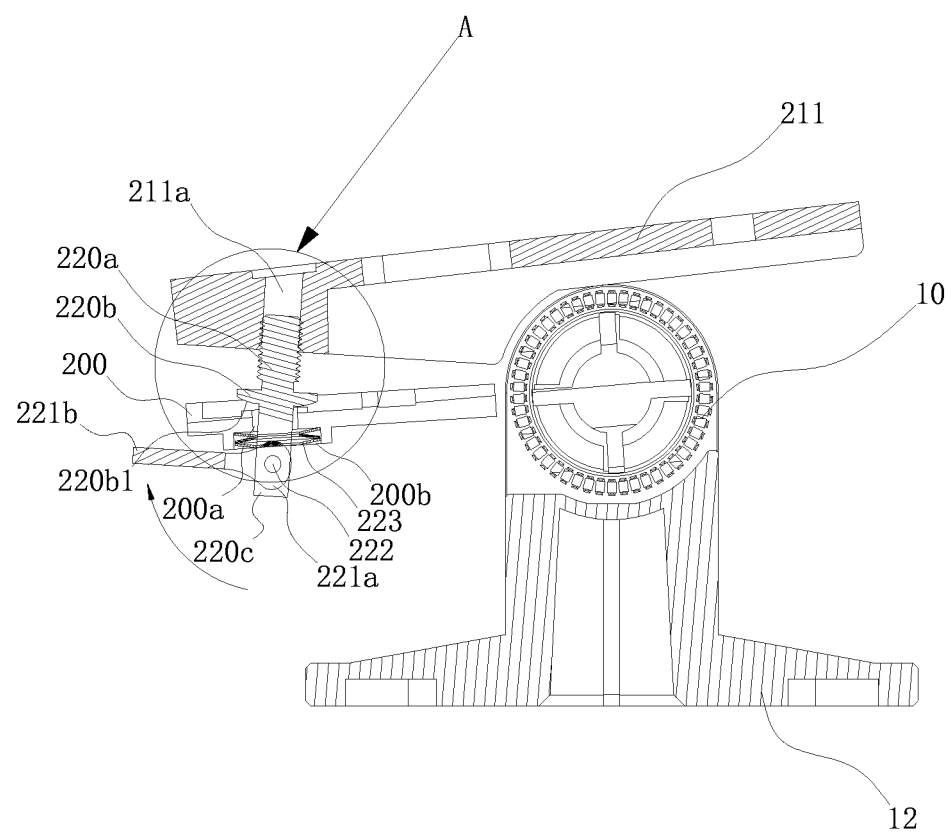
FIG. 7 is a cross-sectional structural view of a T-direction supporting base and a rotary adjustment mechanism with s cam is in a locked position disclosed by the embodiment of the present application.
Figure 8:
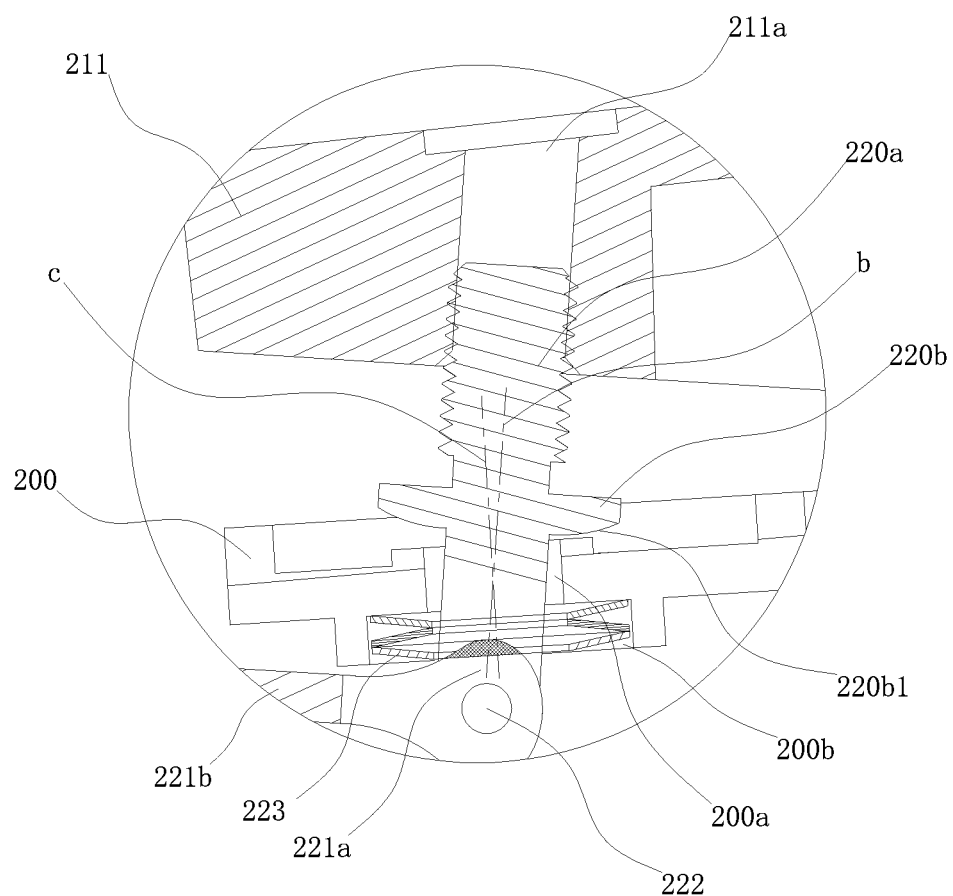
FIG. 8 is a partial enlarged view of part A in FIG. 7.

As shown in FIG. 5, the fine adjustment bolt assembly 22 includes a fine adjustment bolt 220. The fine adjustment bolt 220 is provided with a threaded portion 220a and a limiting portion 220b. The fine adjustment bolt 220 passes through the limiting hole 200a, and the threaded portion 220a and the fine adjustment threaded hole 211a are threadedly connected. Therefore, the threaded portion 220a and the connection base 211 are remained in a connection state, and cannot escape from each other along an axis of the fine adjustment bolt 220 by themselves. The limiting portion 220b is lifted by an edge of the limiting hole 200a and cannot pass through the limiting hole 200a. That is, the fine adjustment bolt 220 cannot escape from the limiting hole 200a downwardly by itself, so that the adapter 21 can be supported by the rotatory supporting base 20 under gravity only and rotate with it for rough adjustment.

When the adapter 21 is roughly adjusted to a position close to a predetermined angle by rotation with the rotatory supporting base 20, a posture between the rotatory supporting base 20 and the T-direction supporting base 1 is fixed. The fine adjustment bolt 220 is then rotated. Due to the lifting and limiting relationship between the limiting portion 220b and the limiting hole 200a, the extent to which the fine adjustment bolt 220 passes through the limiting hole 200a is always consistent. However, the length of the threaded portion 220a extending into the fine adjustment threaded hole 211a changes with the rotation of the fine adjustment bolt, which causes the change in the T-direction angle between the connection base 211 and the fine adjustment plate 200. Since the T-direction angle between the fine adjustment plate 200 and the T-direction supporting base 1 has been fixed by the engagement of the fixed tooth slot 10 and the rotatory tooth slot 201 at this time, the change in the T-direction angle between the connection base 211 and the fine adjustment plate 200 can cause the fine adjustment of the camera 5 in the T-direction angle, so that the camera can meet the required angle accuracy requirements.

For example, through the engagement of the fixed tooth slot 10 and the rotatory tooth slot 201, only the accuracy requirement of 7.2° can be achieved. In the embodiment of the present application, when the T-direction angle of the current camera 5 differs from the predetermined angle by less than 7.2° through the engagement of the fixed tooth slot 10 and the rotatory tooth slot 201, the T-direction angle between the rotatory supporting base 20 and the adapter 21 can be finely adjusted by the rotation of the fine adjustment bolt 220, so that finally the required T-direction angle can be achieved between the adapter 21 and the camera 5. The T-direction angle that can be adjusted by the fine adjustment bolt 220 is preferably close to or exceeds the minimum value of the angle adjustment between the fixed tooth slot 10 and the rotatory tooth slot 201 to achieve full-angle coverage adjustment.

The camera bracket according to the embodiment of the present application takes the axis a of the fixed tooth slot 10 and the rotatory tooth slot 201 as the rotation axis for both rough adjustment and fine adjustment, so that both the rough adjustment and the fine adjustment can be performed coaxially, which thereby leads to a higher adjustment accuracy.

In the embodiments of this application, in the initial state (usually the fine adjustment plate 200 is attached to the connection base 211), the fine adjustment threaded hole 211a, the limiting hole 200a, and the fine adjustment bolt 220 are in a coaxial state. Since the relative movement between the adapter 21 and the rotatory supporting base 20 during the fine adjustment is essentially the rotation of the adapter 21 along the axis a of the fixed tooth slot 10 and the rotatory tooth slot 201, the axis of the fine adjustment threaded hole 211a will change with the rotation of the adapter 21 and is no longer coaxial with the limiting hole 200a. The movement trajectory between the fine adjustment bolt 220 and the fine adjustment threaded hole 211a is linear along the axis of the fine adjustment threaded hole 211a. Therefore, in order to ensure the linear movement of the fine adjustment bolt 220 and the fine adjustment threaded hole 211a, the fine adjustment bolt 220 needs to be able to change the posture of its axis b along with the fine adjustment threaded hole 211a, so that the axis b of the fine adjustment bolt 220 and the axis c of the limiting hole 200a gradually form an angle and are no longer coaxial.

In order to perform the above process smoothly, as shown in FIGS. 5 to 8, in the embodiment of the present application, an arc-shaped guiding surface 220b1 is provided on the limiting portion 220b and is lifted by the edge of the limiting hole 200a. As the fine adjustment progresses, the limiting hole 200a and the arc-shaped guiding surface 220b1 can naturally slide relative to each other, so as to continuously change the angle between the axis b of the fine adjustment bolt 220 and the axis c of the limiting hole 200a in cooperation. In a possible embodiment, the edge of the limiting hole 200a can also be formed as an arc-shaped structure (not shown in the figures) matching the arc-shaped guiding surface 200b1 to further improve the smoothness.

In the embodiment of the present application, the camera 5 can be fixed above the connection base 211 by lifting, or can be fixed below the connection base 211 by hanging. Normally, since the upper side of the connection base 211 is relatively unoccupied, the camera 5 is fixed on the upper side of the connection base 211 by lifting.

At the same time, when the rotatory connection portion 210 is coaxially and rotatably connected to the rotatory tooth slot 201, the connection base 211 can be located above the fine adjustment plate 200 or below the fine adjustment plate 200. When the connection base 211 is located above the fine adjustment plate 200, the fine adjustment threaded hole 211a is also located above the limiting hole 200a, so that the limiting portion 220b is located above the limiting hole 200a, that is, located between the fine adjustment threaded hole 211a and the limiting hole 200a. When the connection base 211 is located below the fine adjustment plate 200, the fine adjustment threaded hole 211a is located below the limiting hole 200a, and the limiting portion 220b is still located above the limiting hole 200a, that is, located on a side of the limiting hole 200a away from the fine adjustment threaded hole 211a.

Both of the above two setting methods can realize the T-direction fine adjustment of the camera 5. However, compared to the solution in which the connection base 211 is located above the fine adjustment plate 200, there is a risk that the connection base 211 is rotated downwards and falls as a whole due to the threaded portion 220a being completely disengaged from the fine adjustment threaded hole 211a in the solution where the connection base 211 is located below the fine adjustment plate 200. In a normal case, the fine adjustment angle is relatively small, so that a gap between the connection base 211 and the fine adjustment plate 200 is also small. It is difficult to operate the fine adjustment bolt in this small gap. Therefore, the operation of the fine adjustment bolt 220 is usually applied to a portion of the fine adjustment bolt 220 that penetrates out of the limiting hole 200a. For example, the fine adjustment bolt 220 is provided with an adjustment portion 220c. The threaded portion 220a, the limiting portion 220b, and the adjustment portion 220c are sequentially arranged while the adjustment portion 220c passes through the limiting hole 200a.

In the solution in which the connection base 211 is located below the fine adjustment plate 200, the adjustment portion 220c needs to be located above, which will increase the difficulty of operation for the operator. Therefore, when the rotatory connection portion 210 is coaxially and rotatably connected to the rotatory tooth slot 201, the connection base 211 is located above the fine adjustment plate 200 in a more preferable solution.

In the embodiment of the present application, the adjustment portion 220c can be designed in a triangular, hexagonal, minus sign-shaped slot, cross slot and the like structure, so as to facilitate rotation with auxiliary tools. However, these methods require operators to carry auxiliary tools with them, which is not convenient for installation and adjustment operations. In order to simplify the installation and adjustment process, in a possible implementation, the fine adjustment bolt assembly 22 may further include a rotatory adjustment member 221, the rotatory adjustment member 221 is connected to the adjustment portion 220c. The shape of the rotatory adjustment member 221 can be designed according to the principle of increasing the torque, so that the operator can directly perform the rotating operation with his own hand strength without using auxiliary tools, thereby simplifying the installation and adjustment process.

After the camera 5 is adjusted to a suitable angle through the rotation of the fine adjustment bolt 220, it is desirable that the fine adjustment bolt 220 can be fixed at this position and cannot be easily rotated. To achieve this, the fine adjustment bolt assembly 22 in the embodiment of the present application can further include a connection shaft 222 and the rotatory adjustment member 221 has a cam 221a. The connection shaft 222 sequentially passes through the cam 221a and the adjustment portion 220c, and rotatably connects the cam 221a to the adjustment portion 220c. At this time, the rotatory adjustment member 221 can rotate as a whole with the connection shaft 222 as an axis, and the cam 221a will also rotate along with it during the rotation. Since the cam 221a has an eccentric structure relative to the connection shaft 222, a locking position can be designed on the rotation path of the cam 221a with this feature. When the cam 221a rotates to the locking position, it interferes with a certain structure and generates a strong interaction force to fix the cam 221a at this position, so that the rotatory adjustment member 221 is entirely locked and cannot easily continue to rotate.

A gasket 223 can be provided inside the fine adjustment bolt assembly 22, and is sleeved on the adjustment portion 220c and located on a side of the limiting hole 200a away from the limiting portion 220b. When the cam 221a is in the locking position, the cam 221a can press the gasket 223 towards the inside of the limiting hole 220a, thereby forming an interaction force between the cam 221a and the gasket 223 to fix the cam 221a. The gasket 223 can be made of a material with a certain degree of elasticity, such as a disc spring. In this way, when the cam 221a presses the gasket 223, the gasket 223 can be elastically deformed, so as to ensure that the limiting portion 220b of the fine adjustment bolt 220 and the limiting hole 200a are kept in close contact at all times. In a scene where vibration occurs, the adapter 21 and the camera 5 are prevented from jumping up. In addition, multiple gaskets 223 can be used in combination to increase the compressed stroke and elasticity. In order to prevent the gasket 223 from being displaced, a gasket-limiting slot 200b can be provided around the limiting hole 200a in the fine adjustment plate 200, and the gasket 223 can be embedded in the gasket-limiting slot 200b for fixing.

In the embodiment of the present application, the rotatory adjustment member 221 can be provided with a trigger 221b for the operator to manually rotate. The trigger 221b is in its optimal operating position when it is on a side of the cam 221a away from the limiting hole 200a, thus in order to facilitate the operation of the trigger 221b by the operator, this position should not be set as the locking position. The locking position should be a position other than this position. For example, the locking position can be designed to have an angle close to 90° relative to the optimal operating position.

In the embodiment of the present application, the coaxial engagement of the fixed tooth slot 10 and the rotatory tooth slot 201 can be realized by the structures of the fixed tooth slot 10 and the rotatory tooth slot 201, for example, by providing a snap-on structure between them that can be snap-fitted at any angle. The fixed tooth slot 10 and the rotatory tooth slot 201 can also be coaxially engaged and connected by a connection bolt 6 or other structures. As shown in FIG. 5, a connection post 202 can be provided on the rotatory supporting base 20 to coaxially connect the connection post 202 to the rotatory tooth slot 201, and at the same time, a connection through hole 210a is provided in the rotatory connection portion 210, so that when the fixed tooth slot 10 is engaged with the rotatory tooth slot 201, the connection post 202 passes through the connection through hole 210a coaxially. Meanwhile, the rotatory adjustment mechanism 2 can further include a coaxial connection assembly 23. The coaxial connection assembly 23 is structurally associated with both the connection post 202 and the rotatory connection portion 210. The coaxial connection assembly 23 can prevent the connection post 202 from being disengaged from the connection through hole 210a along the axis a of the rotatory tooth slot 201.

Specifically, the coaxial connection assembly 23 can include an abutment member 230 and a limit screw 231, and a limit screw hole 202a is provided in the connection post 202. The abutment member 230 abuts against a side of the connection through hole 210a facing away from the fixed tooth slot 10, and a limiting through hole 230a is provided in the abutment member 230. The limit screw 231 passes through the limiting through hole 230a and is threadedly connected to the limit screw hole 202a, thereby limiting the connection post 202 inside the connection through hole 210a. The abutment member 230 can adopt a sheet-like structure or a skeleton-like structure, wherein the sheet-like structure is more common.

Further, a wave gasket 232 can be added in the coaxial connection assembly 23, and the wave gasket 232 is arranged between the rotary connection portion 210 and the abutment member 230. The wave gasket 232 has a certain degree of elasticity. When the wave gasket 232 is deformed by the pressing force from the direction of axis a, it can generate an elastic pressing force through its own deformation, so as to provide a cushioning force for the rotary supporting base 20 and the adapter 21 in the direction of axis a to reduce shaking in this direction.

Figure 1:
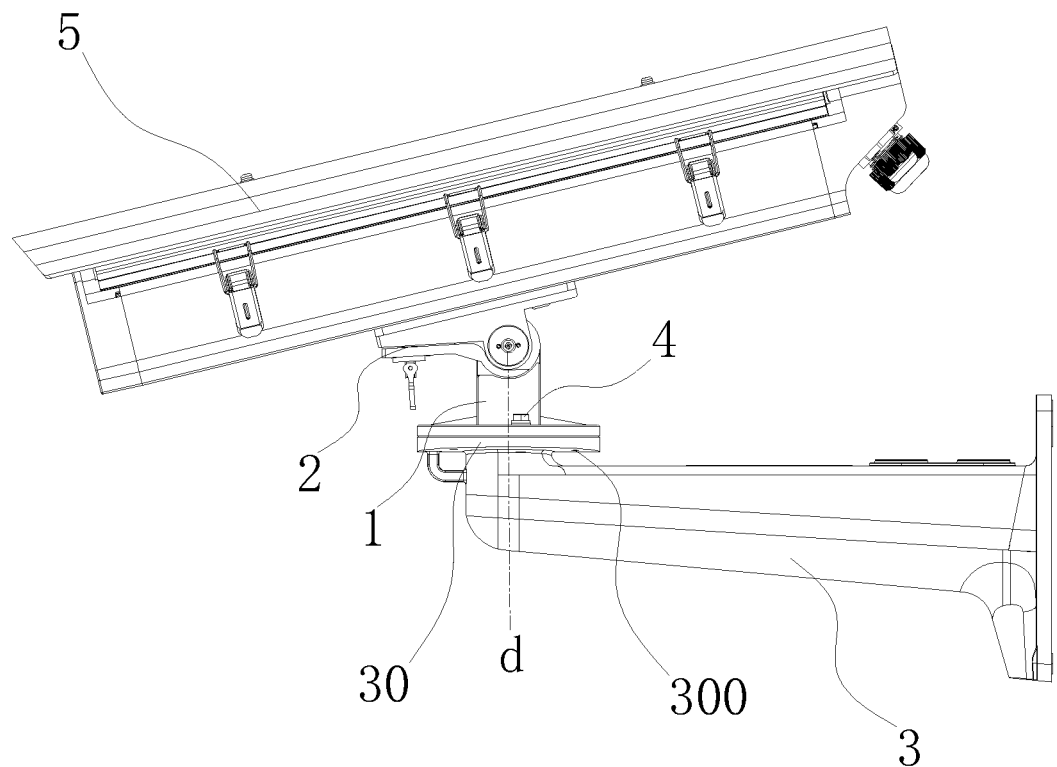
FIG. 1 is a view of an overall assembly structure of a camera bracket and a camera disclosed by an embodiment of the present application.

For the camera bracket, in addition to the T-direction angle adjustment, the P-direction angle can also be adjusted. Specifically, as shown in FIG. 1, the camera bracket in the embodiment of the present application can further include a P-direction supporting base 3. The P-direction supporting base 3 has an adjustment shaft d perpendicular to the horizontal plane, the T-direction supporting base 1 is connected to the P-direction supporting base 3, and can adjust the P-direction angle along the adjustment shaft d.

Since the P-direction adjustment is not affected by gravity, there is no need to adopt a tooth engagement structure that overcomes gravity, and a higher-precision adjustment structure can be directly adopted. As shown in FIG. 1 to FIG. 8, the camera bracket according to the embodiment of the present application provides a structure with a relatively simple structure and easy adjustment and operation for reference.

Figure 2:
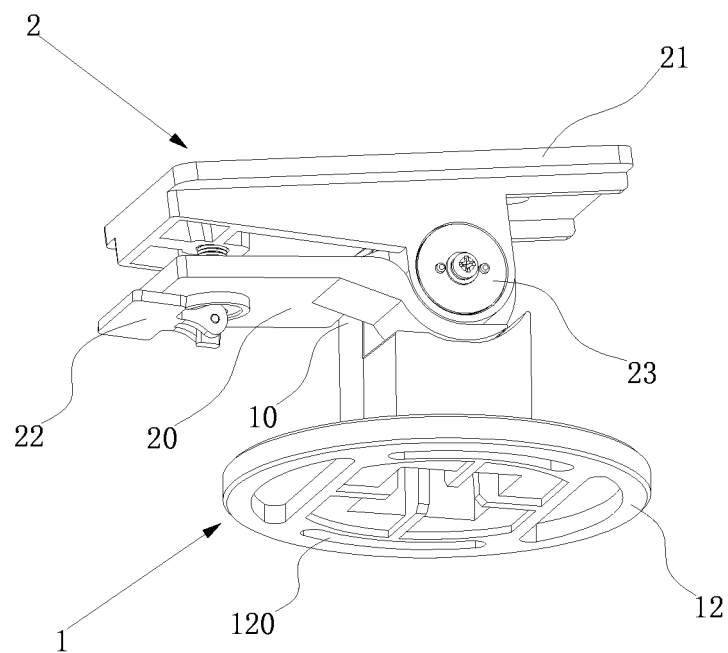
FIG. 2 is a view of an overall assembly structure of a T-direction supporting base and a rotary adjustment mechanism disclosed by an embodiment of the present application.

Specifically, as shown in FIG. 1, in this solution, the P-direction supporting base 3 is provided with a supporting base flange 30. A plurality of adjustment holes 300 are arranged in the supporting base flange 30 along a circumferential direction of the adjustment shaft d. Further, as shown in FIGS. 2 to 4, the T-direction supporting base 1 is provided with a P-direction flange 12, and the fixed tooth slot 10 and the P-direction flange 12 are in a fixed connection state. In addition, the P-direction flange 12 is provided with an arc-shaped adjustment hole 120 extending in the circumferential direction of the adjustment shaft d. When the supporting base flange 30 is aligned with the P-direction flange 12 at any angle, the arc-shaped adjustment holes 120 are all aligned with the plurality of adjustment holes 300.

In the embodiment of the present application, the arc length and the number of the arc-shaped adjustment holes 120 and the distribution of the adjustment holes 300 can be controlled to realize the alignment of the arc-shaped adjustment holes 120 with the plurality of adjustment holes 300. For example, two arc-shaped adjustment holes 120 are symmetrically arranged with respect to the adjustment shaft d, and the arc length of each of the arc-shaped adjustment holes 120 can be greater than a distance between two adjacent adjustment holes 300, so that each of the arc-shaped adjustment holes 120 can be aligned with at least one adjustment hole 300 regardless of the angle at which the supporting base flange 30 and the P-direction flange 12 are aligned with each other, so as to realize the effect that the whole arc-shaped adjustment hole 120 is aligned with the multiple adjustment holes 300. On this basis, the camera bracket further includes a fastening bolt assembly 4 that passes through the arc-shaped adjustment hole 120 and the adjustment hole 300, and fixes the supporting base flange 30 and the P-direction flange 12.

The camera bracket in the embodiment of the present application can also adopt other feasible P-direction adjustment structures, which are all within the protection scope of the present application, and will not be repeated here.

In summary, the camera bracket according to the embodiments of the present application can finely adjust the T-direction angle, so as to meet the required angle accuracy requirements.

The above embodiments of this application focus on the differences between the various embodiments. The different optimization features between the various embodiments can be combined to form a more optimal embodiment as long as they are not contradictory. Considering the conciseness of the text, it will not be repeated here.

The above description is only for preferred embodiments of the present application, and should not be taken as limitations on the present application. Any modifications, equivalents, improvements and the like should be included in the protection scope of the present application.

What is claimed is:

1. A camera bracket, comprising a T-direction supporting base and a rotatory adjustment mechanism;
    wherein a fixed tooth slot is provided in the T-direction supporting base;
    wherein the rotatory adjustment mechanism comprises a rotatory supporting base, an adapter and a fine adjustment bolt assembly, and the rotatory supporting base comprises a fine adjustment plate and a rotatory tooth slot coaxially engaged with the fixed tooth slot, and the fine adjustment plate is fixedly connected to the rotatory tooth slot, and a limiting hole is provided in the fine adjustment plate;
    wherein the adapter comprises a rotatory connection portion and a connection base for connecting a camera, and the rotatory connection portion is fixedly connected to the connection base and can be coaxially and rotatably connected to the rotatory tooth slot, and the connection base is provided with a fine adjustment threaded hole corresponding to the limiting hole;
    when the rotatory connection portion is coaxially and rotatably connected to the rotatory tooth slot, the fine adjustment threaded hole can be aligned with the limiting hole in a vertical plane perpendicular to an axis of the rotatory tooth slot;
    wherein the fine adjustment bolt assembly comprises a fine adjustment bolt provided with a threaded portion and a limiting portion, and the fine adjustment bolt passes through the limiting hole, and the threaded portion is threadedly connected to the fine adjustment threaded hole, and the limiting portion is lifted by an edge of the limiting hole and cannot pass through the limiting hole.

2. The camera bracket according to claim 1, wherein the connection base is located above the fine adjustment plate when the rotatory connection portion is coaxially and rotatably connected to the rotatory tooth slot.

3. The camera bracket according to claim 2, wherein the fine adjustment bolt further comprises an adjustment portion, and the threaded portion, the limiting portion and the adjustment portion are sequentially arranged, and the adjustment portion passes through the limiting hole.

4. The camera bracket according to claim 3, wherein the fine adjustment bolt assembly further comprises a rotatory adjustment member connected to the adjustment portion.

5. The camera bracket according to claim 4, wherein the fine adjustment bolt assembly further comprises a connection shaft, and the rotatory adjustment member has a cam, and the connection shaft sequentially passes through the cam and the adjustment portion and rotatably connects the cam to the adjustment portion, and the cam and the adjustment portion have a locking position that can be reached by rotation.

6. The camera bracket according to claim 5, wherein the fine adjustment bolt assembly further comprises a gasket, which is sleeved on the adjustment portion and is located on a side of the limiting hole away from the limiting portion, and the cam presses the gasket towards an inside of the limiting hole when the cam is in the locking position.

7. The camera bracket according to claim 6, wherein a gasket-limiting slot is further provided around the limiting hole in the fine adjustment plate, and the gasket is embedded in the gasket-limiting slot.

8. The camera bracket according to claim 5, wherein the rotatory adjustment member is further provided with a trigger, the cam and the adjustment portion are not in the locking position when the trigger is located on a side of the cam away from the limiting hole.

9. The camera bracket according to claim 1, wherein the limiting portion is provided with an arc-shaped guiding surface lifted by the edge of the limiting hole, and the limiting hole and the arc-shaped guiding surface can cooperate to change an angle between an axis of the fine adjustment bolt and an axis of the limiting hole.

10. The camera bracket according to claim 1, wherein the rotatory supporting base is further provided with a connection post coaxially connected to the rotatory tooth slot, and the rotatory connection portion is provided with a connection through hole through which the connection post coaxially passes;

the rotatory adjustment mechanism further comprises a coaxial connection assembly that prevents the connection post from being disengaged from the connection through hole along the axis of the rotatory tooth slot.

11. The camera bracket according to claim 10, wherein the coaxial connection assembly comprises an abutment member and a limit screw, and a limit screw hole is provided in the connection post, and the abutment member abuts against a side of the connection through hole away from the rotatory tooth slot, and a limiting through hole is provided in the abutment member, and the limit screw passes through the limiting through hole and is threadedly connected to the limit screw hole.

12. The camera bracket according to claim 11, wherein the coaxial connection assembly further comprises a wave gasket arranged between the rotatory connection portion and the abutment member.

13. The camera bracket according to claim 1, further comprising a P-direction supporting base, which has an adjustment shaft perpendicular to a horizontal plane, the T-direction supporting base is connected to the P-direction supporting base and can adjust an angle of the T-direction supporting base along the adjustment shaft.

14. The camera bracket according to claim 13, wherein the P-direction supporting base is provided with a supporting base flange, and a plurality of adjustment holes are arranged in the supporting base flange along a circumferential direction of the adjustment shaft, and the T-direction supporting base is provided with a P-direction flange fixedly connected to the fixed tooth slot, and the P-direction flange is provided with an arc-shaped adjustment hole extending along the circumferential direction of the adjustment shaft, and the arc-shaped adjustment hole is aligned with a plurality of the adjustment holes when the supporting base flange is aligned with the P-direction flange at any angle;

the camera bracket further comprises a fastening bolt assembly that passes through the arc-shaped adjustment hole and the adjustment hole and fixes the supporting base flange and the P-direction flange.

\* \* \* \* \*